(12) United States Patent
Kress et al.

(10) Patent No.: US 11,879,586 B2
(45) Date of Patent: *Jan. 23, 2024

(54) THERMALLY INSULATED MEDIUM PIPES HAVING HFO-CONTAINING CELL GAS

(71) Applicant: Brugg Rohr AG Holding, Brugg (CH)

(72) Inventors: Jürgen Kress, Oberwil-Lieli (CH); Christian Dambowy, Gebenstorf (CH)

(73) Assignee: BRUGG ROHR AG HOLDING, Brugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,113

(22) Filed: Jan. 31, 2023

(65) Prior Publication Data
US 2023/0184368 A1 Jun. 15, 2023

Related U.S. Application Data

(60) Continuation of application No. 18/052,962, filed on Nov. 7, 2022, which is a division of application No.
(Continued)

(30) Foreign Application Priority Data

Jul. 20, 2016 (CH) .................................. 00937/16

(51) Int. Cl.
*F16L 59/14* (2006.01)
*B32B 5/20* (2006.01)
(Continued)

(52) U.S. Cl.
CPC ............ *F16L 59/143* (2013.01); *B29C 44/04* (2013.01); *B29C 44/12* (2013.01); *B29D 23/001* (2013.01);
(Continued)

(58) Field of Classification Search
CPC ....... B29C 44/04; B29C 44/12; B29C 48/151; B29C 48/21; B29D 23/001; B32B 1/08;
(Continued)

(56) References Cited

U.S. PATENT DOCUMENTS 9,862,127 B2 * 1/2018 Bronnum ............... F16L 59/143
2011/0308659 A1 12/2011 Tsai et al.
(Continued)

FOREIGN PATENT DOCUMENTS

CA 2 879 364 A1 1/2014
EP 1471299 B1 10/2004
(Continued)

OTHER PUBLICATIONS

Cadwallader et al. "Reliability Estimation for Double Containment Piping." Idaho National Laboratory. 20th ANS Topical Meeting on the Technology of Fusion Energy. Aug. 2012. 7 pages.
(Continued)

*Primary Examiner* — Michael C Miggins
(74) *Attorney, Agent, or Firm* — McCormick, Paulding & Huber PLLC

(57) ABSTRACT

The invention relates to a thermally insulated conduit pipe, comprising at least one medium pipe, at least one thermal insulation arranged around the medium pipe, and at least one outer jacket arranged around the thermal insulation, wherein the outer jacket possibly comprises a barrier made of plastic, and wherein the thermal insulation comprises a foam, the cell gas of which contains at least 10 vol % HFOs. Such conduit pipe has good insulating behavior, good environmental balance, and is easily producible.

23 Claims, 2 Drawing Sheets

Related U.S. Application Data

16/311,762, filed as application No. PCT/EP2017/067419 on Jul. 11, 2017, now Pat. No. 11,493,163.

(51) Int. Cl.

| | | |
|---|---|---|
| *B32B 15/04* | (2006.01) | |
| *B32B 27/06* | (2006.01) | |
| *B32B 27/08* | (2006.01) | |
| *B32B 27/30* | (2006.01) | |
| *B32B 1/08* | (2006.01) | |
| *C08J 9/12* | (2006.01) | |
| *C08J 9/14* | (2006.01) | |
| *B32B 5/18* | (2006.01) | |
| *B29C 44/04* | (2006.01) | |
| *B29C 44/12* | (2006.01) | |
| *B29D 23/00* | (2006.01) | |
| *B29C 48/21* | (2019.01) | |
| *B29C 48/151* | (2019.01) | |
| *B29K 27/12* | (2006.01) | |
| *B29K 105/04* | (2006.01) | |
| *B29L 23/00* | (2006.01) | |

(52) U.S. Cl.
CPC .................. *B32B 1/08* (2013.01); *B32B 5/18* (2013.01); *B32B 5/20* (2013.01); *B32B 15/046* (2013.01); *B32B 27/065* (2013.01); *B32B 27/08* (2013.01); *B32B 27/306* (2013.01); *C08J 9/122* (2013.01); *C08J 9/141* (2013.01); *C08J 9/144* (2013.01); *C08J 9/146* (2013.01); *C08J 9/149* (2013.01); *B29C 48/151* (2019.02); *B29C 48/21* (2019.02); *B29K 2027/12* (2013.01); *B29K 2105/04* (2013.01); *B29K 2995/0015* (2013.01); *B29L 2023/225* (2013.01); *B32B 2266/025* (2013.01); *B32B 2266/0264* (2013.01); *B32B 2266/0278* (2013.01); *B32B 2266/08* (2013.01); *B32B 2307/304* (2013.01); *B32B 2307/726* (2013.01); *B32B 2307/7242* (2013.01); *B32B 2597/00* (2013.01); *C08J 2201/03* (2013.01); *C08J 2203/06* (2013.01); *C08J 2203/14* (2013.01); *C08J 2203/162* (2013.01); *C08J 2203/182* (2013.01); *C08J 2203/202* (2013.01); *C08J 2205/052* (2013.01); *C08J 2207/00* (2013.01); *C08J 2323/06* (2013.01); *C08J 2367/02* (2013.01); *C08J 2375/04* (2013.01)

(58) Field of Classification Search
CPC ....... B32B 5/20; B32B 15/046; B32B 27/065; B32B 27/08; B32B 27/306; B32B 2266/025; B32B 2266/0278; B32B 2597/00; C08J 9/122; C08J 9/141; C08J 9/146; C08J 9/149; C08J 2203/06; C08J 2203/14; C08J 2203/162; C08J 2203/182; C08J 2203/202; B29K 2027/12; B29K 2105/04; B29K 2995/0015; B29L 2023/225

See application file for complete search history.

(56) References Cited

U.S. PATENT DOCUMENTS

| | | | |
|---|---|---|---|
| 2015/0028247 A1 | 1/2015 | Peters et al. | |
| 2016/0200889 A1* | 7/2016 | Parenti | C08G 18/14 |
| | | | 521/131 |

FOREIGN PATENT DOCUMENTS

| | | | | |
|---|---|---|---|---|
| WO | 2013/082963 A1 | 6/2013 | | |
| WO | 2015/112849 A1 | 7/2015 | | |
| WO | WO2016094762 | * | 6/2016 | .............. F25D 3/02 |

OTHER PUBLICATIONS

"FLEXWELL Safety Pipe, Pipe system for installations." Brugg Pipesystems. Mar. 2019. 2 pages.
"District heating pipes—Bonded single pipe systems for directly buried hot water networks—Factory made pipe assembly of steel service pipe, polyurethane thermal insulation and a casing of polyethylene." European Committee for Standardization. Oct. 2019. 42 pages.
"District heating pipes—Pre-insulated flexible pipe systems—Part 1: Classification, general requirements and test methods." European Committee for Standardization. Dec. 2014. 31 pages.
"District heating pipes—Pre-insulated flexible pipe systems—Part 2: Bonded plastic service pipes—Requirements and lest methods." European Committee for Standardization. Dec. 2014. 12 pages.
"District heating pipes—Pre-insulated flexible pipe systems—Part 3: Non bonded system with plastic service pipes; requirements and test methods." European Committee for Standardization. Dec. 2014. 9 pages.
Edited by Klempner et al. "Handbook of Polymeric Foams and Foam Technology." 2nd Edition. Hanser Publishers. Excerpts from Ch. 10 and 15. 2004. 6 pages.
Mackenzie-Kennedy "District Heating, Thermal Generation and Distribution: A practical guide to centralised generation and distribution of heat services." International Series in Heating, Ventilation and Refrigeration. Pergamon Press. 1979. vol. 13. 4 pages.
Svanström et al. "A Method for Analysing the Gas Phase in Polyurethane Foam." Journal of Cellular Plastics. vol. 31. Department of Chemical Environmental Science, Chalmers University of Technology. pp. 375-388. 1995.
Nord Composites Italia, Resins Technology. "Polyester Polyols." Borchure. May 2018. 12 pages.
Hinna Instruments. "Measuring Moisture in Polyols." Web Article. Apr. 2015. 7 pages.
"FLEXpipes." ISOPLUS Fernwarmetechnik Flexible Rohrsysteme. Apr. 2005. 2 pages. Machine-generated English translation.
"Isoplus Fernwarmetechnik." Presentation. Isoplus Fernwarmetechnik, 2013. 10 pages. Machine-generated English translation.
"3 FLEXIBLE Piping Systems." isoplus. Manual. Dec. 15, 2011. 4 pages. Machine-generated English translation.
"LOGSTOR FlexPipe." Handbuch—Produkte, Projektierung und Montage. LOGSTOR. Apr. 2015. 16 pages. Machine-generated English translation.
"Polyacrylic compounds to Mercury" Ullmann's Encyclopedia of Technical Chemistry, 4th revised and extended edition. vol. 19. 1980. 16 pages.
Hanser-Verlag. "Polyurethane." Kunststoffhandbuch, Band 7. 1993. 2 pages.

* cited by examiner

THERMALLY INSULATED MEDIUM PIPES HAVING HFO-CONTAINING CELL GAS

CROSS-REFERENCE TO RELATED APPLICATIONS

This application is a continuation of U.S. patent application Ser. No. 18/052,962, filed Nov. 7, 2022, which is a divisional of U.S. patent application Ser. No. 16/311,762, now U.S. Pat. No. 11,493,163, filed Dec. 20, 2018, which is a National Stage application of International Patent Application No. PCT/EP2017/067419, filed Jul. 11, 2017, which claims priority to Swiss Patent Application No. 00937/16, filed Jul. 20, 2016, each of which are hereby incorporated by reference in their entirety.

TECHNICAL FIELD

The invention relates to pipe systems containing a thermal insulation, in particular thermally insulated medium pipes, and also thermally insulated cover devices or bushings for connecting conduit pipes having improved thermal insulation. Furthermore, the invention relates to methods for producing such devices and also the use of polymer foams which contain hydrofluoroolefins (HFO) in such devices and for producing such devices. Finally, the invention relates to the use of HFO as a cell gas in thermal insulations.

BACKGROUND OF THE INVENTION

Pipe systems containing a thermal insulation, also called pre-insulated pipe systems or thermally insulated pipe systems, are known and proven per se. Such pipe systems comprise flexible or rigid medium pipes, which are enclosed by a thermal insulation, which is in turn enclosed by a jacket, and also possibly bushings and/or cover devices. Depending on the construction, these pre-insulated pipe systems are also referred to as a plastic medium pipe system (PMP) or plastic jacketed pipe system (PJP). In the first, the medium pipes used have a certain flexibility, so that the entire composite can also be wound onto drums with a certain application of force. These are therefore also referred to as flexible pipe systems. In the latter, the medium pipes used are not flexible, therefore, reference is also made to rigid pipe systems in the case of the overall composite. Accordingly, thermally insulated medium pipes or conduit pipes having one or more thermal insulation layers are known; as is the production thereof. Thus, methods for the continuous production of thermally insulated medium pipes are known from EP0897788 and from EP2213440. A method for producing individual, rigid pipe sections is known from EP2248648.

In such pipe systems, the foam (for example, polyurethane, PU) generally used as an insulation material changes its composition of its cell gases in the course of time. This takes place due to diffusion of nitrogen and oxygen from the surroundings into the foam and due to diffusion of the foam gases and/or cell gases originally contained in the foam, in particular carbon dioxide and other blowing agents, out of the foam. The air gases have a significantly higher thermal conductivity than the originally contained carbon dioxide and the other typically used blowing agents.

Integrating so-called barrier layers into the outer jacket has been proposed to minimize these diffusion processes.

Metallic layers can be used as the barrier layers. If metallic layers are used, not only is the gas exchange completely suppressed, which is desired, but rather water vapor is also completely prevented from diffusing. This is problematic in particular in the case of the use of medium pipes made of plastic, since water typically flows through them as the medium, because of which water vapor, although also only a small quantity, continuously migrates through the walls thereof. This water vapor has to have the possibility of penetrating outward and/or coming into equilibrium with the surroundings, since otherwise water becomes enriched in the thermal insulation of the thermally insulated conduit pipe in the course of time, whereby the thermal conductivity significantly rises and the risk exists that the thermal insulation will become damaged in the long term.

Layers which consist of one or more polymer materials can be used as barrier layers. Thus, EP1355103 describes thermally insulated conduit pipes which contain a barrier layer made of ethylene vinyl alcohol (EVOH), polyamide (PA), or polyvinylidene chloride (PVDC). Furthermore, EP2340929 describes a plastic jacketed pipe, the outer jacket of which is formed as a multilayer pipe and which has a gas permeation barrier layer ("barrier") in its interior. The pipes described in these documents are difficult to produce and/or have an inadequate insulation capability. Conduit pipes having thermal insulation and a polymer barrier layer are known from CH710709 (post-published) and WO2004/003423; these polymers contain polyketones and/or EVOH.

Molded parts and connecting pieces are used for connecting thermally insulated pipes. In particular, cover shells are used as molded parts, as described in WO2008/019791. Or bushings are used as connecting pieces, in particular in the case of the connection of rigid pipes. The mentioned problems also arise in the case of such molded parts and connecting pieces.

SUMMARY OF THE INVENTION

It is an object of the invention to provide a thermally insulated conduit pipe and also molded parts and connecting pieces which do not have the mentioned disadvantages.

The objects outlined above are achieved according to the independent claims. The dependent claims represent advantageous embodiments. Further advantageous embodiments can be inferred from the description and the figures. The general, preferred, and particularly preferred embodiments, ranges, etc. provided in conjunction with the present invention can be combined with one another as desired. Individual definitions, embodiments, etc. can also be omitted and/or can be nonrelevant.

The present invention will be described in detail hereafter. It is apparent that the various embodiments, preferences, and ranges disclosed and described hereafter can be combined with one another as desired. Moreover, individual definitions, preferences, and ranges may not be applied depending on the embodiment. Furthermore, the term "comprising" includes the meanings "containing" and "consisting of".

The terms used in the present invention are used in the generally typical meaning routine to a person skilled in the art. If no other meaning results from the direct context, the following terms in particular have in this case the meaning/definitions indicated here.

BRIEF DESCRIPTION OF THE DRAWINGS

The present invention is furthermore illustrated by the figures; in addition to the following description, further embodiments of the invention can be inferred from these figures.

DESCRIPTION OF THE PREFERRED EMBODIMENTS

Figure 1:
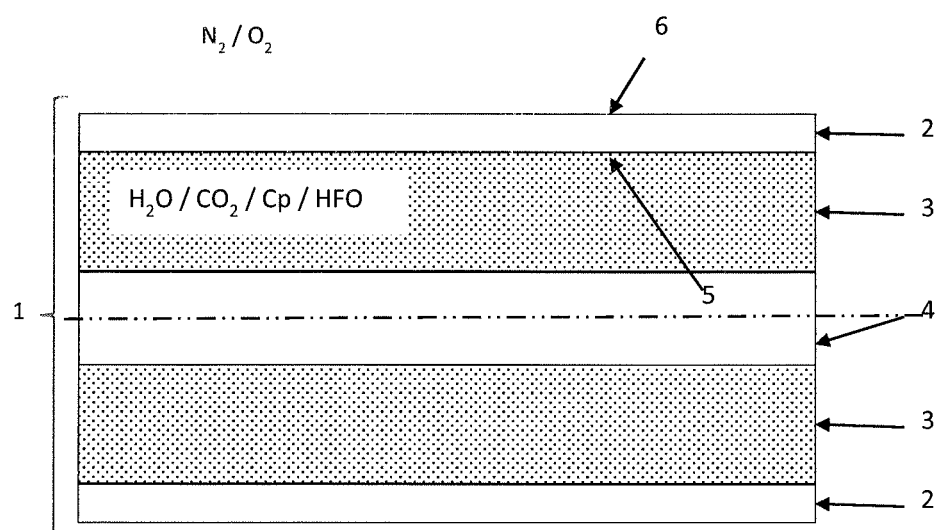
FIG. 1 schematically shows the construction of a conduit pipe (1) according to the invention in cross section. In this case, (2) is the outer jacket having outer side (6) facing toward the surroundings and inner side (5) facing toward the thermal insulation; (3) indicates the thermal insulation with cell gas; (4) is the medium pipe.

In a first aspect, the invention therefore relates to a pipe system containing a thermal insulation (also called pre-insulated pipe system or thermally insulated pipe system), in which said thermal insulation comprises a foam, the cell gas of which contains hydrofluoroolefins (HFOs). Such pipe systems, but without the mentioned cell gas, are known per se and comprise thermally insulated conduit pipes, bushings, and cover devices for connecting such conduit pipes.

In a first embodiment, the invention relates to a thermally insulated conduit pipe (1), comprising at least one medium pipe (4), at least one thermal insulation (3) arranged around the medium pipe, and at least one outer jacket (2) arranged around the thermal insulation, characterized in that said outer jacket (2) possibly comprises a barrier (9) made of plastic, and said thermal insulation (3) comprises a foam, the cell gas of which contains the components defined hereafter.

In a second embodiment, the invention relates to a cover device made of plastic, in particular for the connection points of at least two pipe pieces, which are connected where the cover device has at least one thermal insulation (3) and at least one outer jacket (2) arranged around the thermal insulation, characterized in that said outer jacket (2) possibly comprises a barrier made of plastic, and said thermal insulation (3) comprises a foam, the cell gas of which contains the components defined hereafter.

In a further embodiment, the invention relates to a bushing made of plastic for connecting thermally insulated conduit pipes, wherein the bushing has at least one thermal insulation (3) and at least one outer jacket (2) arranged around the thermal insulation, characterized in that said outer jacket (2) possibly comprises a barrier made of plastic, and said thermal insulation (3) comprises a foam, the cell gas of which contains the components defined hereafter.

This aspect of the invention is to be explained in greater detail hereafter.

Thermal insulation (3): the thermal insulation encloses the medium pipe partially or completely, preferably completely. In particular foamed plastics ("foams"), which contain a cell gas in the cells thereof, are suitable as the thermal insulation. The thermal insulation can be homogeneous along its cross section or can be constructed from multiple layers. The thermal insulation in conduit pipes is typically constructed homogeneously.

Cell gases: The gases present in the thermal insulation are referred to as cell gases. They are a result of the production and are composed of chemical and physical blowing agents, and/or the reaction products thereof. Such cell gases are typically added during the foaming process, or they are formed during the foaming process.

According to the present application, the cell gas in the foam of the thermal insulation is characterized in that it contains hydrofluoroolefins (HFOs). The cell gas can consist of only one or of multiple HFOs and can possibly contain additional further components. The cell gas advantageously contains 10-100 vol % HFOs, preferably 20-100 vol % HFOs, more preferably 30-100 vol % HFOs, particularly preferably 40-100 vol % HFOs, very particularly preferably 50-100 vol % HFOs. The cell gas can accordingly contain further components.

In one embodiment, the cell gas contains 0-50 vol % (cyclo)-alkanes, preferably 0-45 vol % (cyclo)-alkanes, more preferably 0-40 vol % (cyclo)-alkanes, particularly preferably 0-35 vol % (cyclo)-alkanes. The ratio of HFOs to (cyclo)-alkanes is preferably at least 2.5:1, preferably at least 3:1.

In a further embodiment, the cell gas additionally or alternatively contains up to 50 vol % $CO_2$, preferably 0-40 vol % CO2, particularly preferably 0-30% CO2. In a further embodiment, the cell gas additionally or alternatively contains up to 5 vol % nitrogen ($N_2$) and/or oxygen ($O_2$).

These further components can be added to the blowing agent like, for example, the mentioned (cyclo)-alkanes; they can arise during the production of the foam like, for example, $CO_2$; they can enter the foam during the production process like, for example, air, $O_2$, $N_2$.

It has surprisingly been shown that even at such low proportions as, for example, 10 vol % HFO in the cell gas, the properties of pipe systems, in particular of thermally insulated conduit pipes, improve in an array of features.

Specifically, it has been found that the conduit pipes described here have a surprisingly improved insulation behavior. Without feeling bound to a theory, it is presumed that the improved insulation properties are established not only by material properties of the HFOs (thermal conductivity), but rather also by improved foaming, induced by the changed viscosity.

In the case of PU foams and PIR foams, the addition of HFO to one of the two starting components (isocyanate or polyol, respectively) and/or during the direct mixing in the mixing head results in a marked viscosity reduction. Without feeling bound to a theory, it is presumed that the reduced viscosity improves the mixing of the two components and thus promotes the formation of comparatively smaller cells.

To achieve a viscosity reduction in a similar order of magnitude using cyclopentane as the blowing agent, alternatively its content could also be increased, for example, by 1.86 times. This would be the factor by which the molecular weights of HFO 1233zd (130.5 g/mol) and of cyclopentane (70.2 g/mol) differ, but this would have multiple disadvantageous consequences:

a) On the one hand, a double quantity of the blowing agent gas would expand during the foaming process, which would result in uncontrollable changes of the foam structure. Existing PU foams and the production facilities are optimized for the smaller quantity of cyclopentane and large quantity-related changes with respect to the expanding blowing agent would result in extensive new developments.

b) Cyclopentane acts as a plasticizer of the PU foam. A quantity increased by 1.86 times results in its marked softening. This is not desired, on the one hand, because the foam plays a supporting role, i.e., it is indispensable for the mechanical stability of the entire composite. This is not desired, on the other hand, because the increasing softness of the foam in the production process has the result that the entire pipe composite deviates more and more from the ideal round cross-sectional geometry. It has therefore been found that the complete or partial replacement of cyclopentane by HFOs improves the mechanical properties of the foam. Cyclopentane is typically added to the starting material in order to reduce its viscosity; however, the maximum quantity is limited in that the produced foam has to have sufficient mechanical strength. These contradictory goals can be achieved by the replacement of cyclopentane by HFOs. The use of a comparable quantity of HFO results in starting materials having lowered viscosity with uniform mechanical strength of the final foam. The producibility can thus be improved with uniform product quality.

Furthermore, it has been found that the addition of the HFO to one of the starting components and/or the direct addition to the two starting components in the mixing head reduces the combustibility thereof. This effect is very advantageous because the safety-technology requirements on such a production facility are thus reduced and the design of a corresponding production facility can thus be significantly simplified and costs can thus be saved, which otherwise arise when combustible blowing agents are used.

In summary, it can thus be stated that the known problems can be solved in an elegant manner by the partial or complete replacement of cyclopentane (Cp) by HFOs. On the one hand, more blowing agent can be added, which results in a desired viscosity reduction. At the same time, however, the expanding effect remains substantially unchanged and no fundamental adaptations to formula and production facility are required. Finally, the work protection is improved by the replacement of the combustible cyclopentane by the noncombustible HFO and the investment costs for such a production facility are reduced.

It has furthermore been found that high contents of (cyclo)-alkanes, in particular cyclopentane, have a negative influence on the product quality. Experience has shown that an excessively high content of cyclopentane in the polyol results in the formation of large bubbles in the foam, which occur because the blowing agent (in particular cyclopentane) is expelled from the foam by the temperature of the forming PU foam.

In a continuously operating production process, the outer jacket is typically applied by extrusion and is found at this point in time, because of the high temperature of typically 80-250° C., in a state in which it can easily be deformed. The bubbles then become visible on the outer side of the insulated pipe, because the escaping blowing agent inflates the outer jacket. This applies similarly to insulated pipes having a wavy, a smooth, and a corrugated outer jacket. The escape of the blowing agent is promoted by the temperature of the extruded-on outer jacket. Pipes having such defects are to be considered discards and can no longer be supplied to the practical purpose.

The formation of bubbles is prevented if the content of cyclopentane in the cell gas composition of the resulting insulating foam is 0-50 vol %, preferably 0-45 vol %, particularly preferably 0-40 vol %, most preferably 0-35 vol %.

It has surprisingly been established that upon the use of HFO as a blowing agent, the mentioned bubble formation does not occur. This applies in particular if the content of HFO in the cell gas composition of the resulting insulating foam is within the above-mentioned limits. The described behavior is all the more surprising, since the boiling points are 19° C. in the case of the HFO 1233zd and 33° C. in the case of the HFO 1336mzz, respectively. This is in comparison to cyclopentane, the boiling point of which is 49° C. Because of these boiling points, the expectation that the formation of bubbles would be more pronounced upon the use of the lower-boiling-point HFO as a blowing agent than upon the use of higher-boiling-point (cyclo)-alkanes, for example, Cp. The opposite was observed.

Hydrofluoroolefins (HFOs) are known and commercially available and/or producible according to known methods. They are suitable as a blowing agent gas, in particular because of the low global warming potential (GWP) thereof and because of the harmlessness thereof to the ozone layer of the atmosphere (Ozone Depleting Potential, ODP). The term comprises both compounds which only comprise carbon, hydrogen, and fluorine, and also those compounds which additionally contain chlorine (also referred to as HFCO) and in each case at least one unsaturated bond in the molecule. HFOs can be provided as a mixture of various components or as pure components. HFOs can furthermore be provided as isomeric mixtures, in particular E/Z isomers, or as isomer-pure compounds.

In the scope of the present invention, particularly suitable HFOs are selected from the group comprising compounds of the formula (I)

(I)

in which $R^5$ denotes H, F, Cl, $CF_3$, preferably Cl, $CF_3$, and $R^6$ denotes H, F, Cl, $CF_3$, preferably H.

Particularly suitable HFOs are R1233zd (for example, solstice LBA, Honeywell) and R1336mzz (for example, Formacel 1100, DuPont).

It has surprisingly been shown that the conduit pipes described here have improved insulation behavior if the cell gases of the insulation contain at least 10 vol %, preferably at least 30 vol %, particularly preferably at least 50 vol % HFO. It has furthermore been shown that adding such HFOs to the starting materials of the foam insulation results in improved producibility.

(Cyclo)-alkanes are known as the cell gas of the insulation in thermally insulated pipes. Said alkane or cycloalkane is advantageously selected from the group comprising propane, butane, pentane, cyclopentane, hexane, and cyclohexane. By the combination of (cyclo)-alkane with HFO, a fine adjustment of the product properties can be performed, and/or the producibility can be improved and/or a cost reduction can occur with acceptable quality losses. The mentioned (cyclo)-alkanes can be provided as a pure compound or as mixtures; the aliphatic alkanes can be provided as isomer-pure compounds or as isomeric mixtures. A particularly suitable (cyclo)-alkane is cyclopentane.

Carbon dioxide: If the foam is formed from PU or polyisocyanurate (PIR), $CO_2$ typically arises in a certain quantity, since the starting material polyol in industrial quality normally contains a small quantity of water. This water then reacts with the isocyanate to form carbamic acid, which splits off $CO_2$ spontaneously. The $CO_2$ content of the cell gas is thus linked to the purity of the starting materials and is typically less than 50 vol %. If the starting materials are anhydrous, for example, if polyolefins are formed, the $CO_2$ content of the cell gas is thus at 0 vol %. The $CO_2$ content of the cell gas can thus be influenced via the selection of the starting materials (and/or the purity thereof).

Further cell gases: Components can enter the cell gas from the atmosphere/ambient air because of production. These are substantially $N_2$ and/or $O_2$, for example, air. The content of the cell gases is typically less than 5 vol. %. If the production facility is specially configured, the contact with the atmosphere/ambient air can thus be avoided and the content of further cell gases is 0 vol %.

Foam: Said thermal insulation (3) comprises (i.e., contains or consists of) a foam. Such foams are known per se, foams which meet the norms DIN EN 253:2015-12 (in particular for PJP) and EN15632-1:2009/A1:2014, EN15632-2:2010/A1:2014 and EN15632-3:2010/A1:2014 (in particular for PMP) are particularly suitable. The term comprises hard foams and soft foams. Foams can be closed-cell or open-cell, preferably closed-cell, in particular as represented in the norm DIN EN 253:2015-12. Such foams are preferably selected from the group of polyurethanes (PU), polyisocyanurates (PIR), thermoplastic polyesters (in particular PET), and thermoplastic polyolefins (in particular PE and PP).

It has been shown that the following combinations of foam and cell gas are particularly advantageous:
   PU containing 50-100 vol % R1233zd and 0-50 vol % Cp;
   PU containing 50-100 vol % R1336mzz and 0-50 vol % Cp;
   PIR containing 50-100 vol % R1233zd and 0-50 vol % Cp;
   PIR containing 50-100 vol % R1336mzz and 0-50 vol % Cp;
   PET containing 50-100 vol % R1233zd and 0-50 vol % Cp;
   PET containing 50-100 vol % R1336mzz and 0-50 vol % Cp;
   PE containing 50-100 vol % R1233zd and 0-50 vol % Cp;
   PE containing 50-100 vol % R1336mzz and 0-50 vol % Cp.

In one embodiment, the mentioned cell gases add up to 100 vol %. In a further embodiment, these cell gases add up together with $CO_2$ and air to 100%. In a further embodiment, the ratio of HFO:Cp is at least 2.5:1.

It has furthermore been shown that the following combinations of foam and cell gas are particularly advantageous:
   PU containing 50-100 vol % R1233zd and 0-50 vol % Cp and 0-50 vol % $CO_2$;
   PU containing 50-100 vol % R1336mzz and 0-50 vol % Cp and 0-50 vol % $CO_2$;
   PIR containing 50-100 vol % R1233zd and 0-50 vol % Cp and 0-50 vol % $CO_2$;
   PIR containing 50-100 vol % R1336mzz and 0-50 vol % Cp and 0-50 vol % $CO_2$
   PU containing 50-100 vol % R1233zd and 0-45vol % Cp and 10-40 vol % $CO_2$;
   PU containing 50-100 vol % R1336mzz and 0-45 vol % Cp and 10-40 vol % $CO_2$;
   PIR containing 50-100 vol % R1233zd and 0-45 vol % Cp and 10-40 vol % $CO_2$;
   PIR containing 50-100 vol % R1336mzz and 0-45 vol % Cp and 10-40 vol % $CO_2$.

In one embodiment, the mentioned cell gases add up to 100 vol %. In a further embodiment, these cell gases add up together with air to 100%. In a further embodiment, the ratio of HFO:Cp is at least 3:1.

In a further embodiment, the thermal insulation consists of the mentioned foams and the mentioned cell gases.

Barriers (9): Diffusion barriers are known per se in the field of conduit pipes/pipe systems. If a barrier is present, this barrier is formed as a layer. It is preferable that at least one barrier (9) as described hereafter is provided. It is particularly preferable that one barrier (9) as described hereafter is provided.

This layer (9) enables the diffusion of cell gases out of the thermal insulation and of gases outside the conduit pipe (in particular air) into the thermal insulation to be reduced. This property is important to ensure the insulation capability of the conduit pipe/pipe system over a long time.

In one advantageous embodiment, this layer furthermore enables the diffusion of water out of the thermal insulation. This property is important in particular for conduit pipes/pipe systems, the medium pipe (4) of which consists of plastic. If an aqueous medium is transported in such conduit pipes/pipe systems, water can enter the insulation from the medium through the conduit pipe and thus reduce the insulation capability and damage the insulation material.

In one advantageous embodiment, this layer furthermore enables a certain permeability for $CO_2$ to be provided. A particularly suitable value for the $CO_2$ permeability is in the range of 0.5-100 $cm^3/m^2*day*bar$.

Therefore, a barrier having selective properties is advantageous, in particular: (i) permeable to water and water steam, (ii) impermeable to the cell gases which have a low thermal conductivity, (iii) permeable to the cell gases which arise because of production but have a relatively high intrinsic thermal conductivity (for example, $CO_2$), (iv) impermeable to the gases from the surroundings, in particular nitrogen and oxygen and air.

It has been shown that a conduit pipe of the type mentioned at the outset, in which the barrier comprises one or more of the polymers mentioned hereafter, meets the requirements very well. According to the invention, the barrier can be provided in a single layer or in multiple layers separate from one another. Furthermore, the barriers can be attached by means of an additional layer to the insulation or the outer jacket or in the outer jacket ("adhesion promoter layer" (8), (10)).

Figure 2:
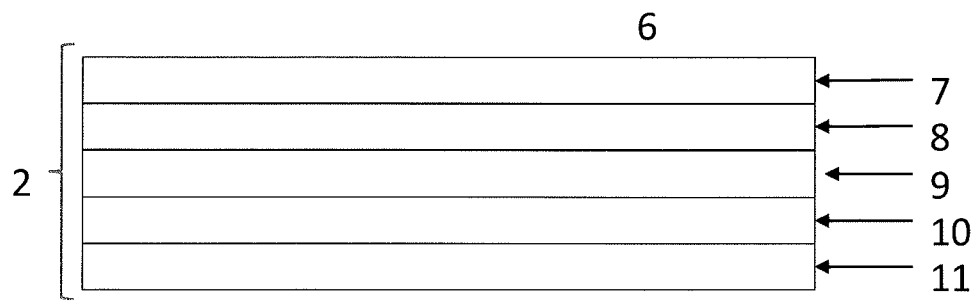
FIG. 2 schematically shows the construction of a preferred embodiment of the outer jacket (2). In this case, (7) is the outer polymer layer (in particular thermoplastic); (8) is an outer adhesion promoter layer, (9) is the barrier layer; (10) is an inner adhesion promoter layer, and (11) is the inner polymer layer (in particular thermoplastic).

The barrier (9) can be arranged as a layer in the outer jacket (2); this is preferable, in particular this embodiment preferably has two adhesion promoter layers (8, 10) adjoining the barrier (9) as illustrated in FIG. 2.

Furthermore, the barrier can be arranged as a layer on the outer side and/or the inner side of the outer jacket. Furthermore, the barrier can be formed by the outer jacket. Furthermore, the barrier (9) can be arranged as a layer between the thermal insulation (3) and the outer jacket (2). In this embodiment, the adhesion promoter layer is typically omitted.

The barrier layer (9) advantageously has a layer thickness of 0.05-0.5 mm, preferably 0.1-0.3 mm. If the barrier forms the outer jacket, the barrier advantageously has a layer thickness of 0.5-5 mm. If provided, the adhesion promoter layers (8, 10) independently of one another have a layer thickness of 0.02-0.2 mm.

The barrier preferably comprises a copolymer of ethylene with carbon monoxide or with vinyl alcohol.

In one advantageous embodiment, the barrier comprises a polymer, which contains polyketones or consists of polyketones. The polymer layer accordingly comprises polyketones and blends of polyketones and also laminates containing polyketones. Polyketones are materials known per se and are characterized by the keto group (C=O) in the polymer chain. In this embodiment, the polymer advantageously has up to 50-100 wt. %, preferably up to 80-100 wt. %, structural units of formulas (II) or the formula (III).

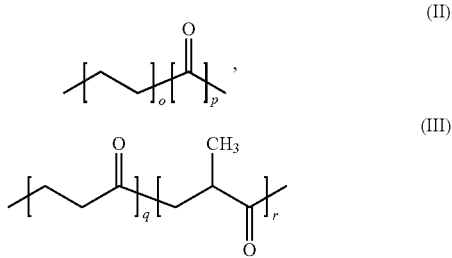

in which
o denotes 1 or 2, preferably 1,
p denotes 1 or 2, preferably 1,
q denotes 1-20, and
r denotes 1-20.

Polyketones are obtainable by catalytic reaction of carbon monoxide with the corresponding alkenes, such as propene and/or ethene. Such ketones are also referred to as aliphatic ketones. These polymers are commercially available, for example, as polyketone copolymers (formula II) or polyketone terpolymers (formula III) from Hyosung. Such polyketones are furthermore commercially available under the tradename Akrotek® PK. Suitable polymers have a melting temperature of greater than 200° C. (measured using DSC 10 K/min according to ISO11357-1/3) and/or have a low water absorption of less than 3%, measured according to DIN EN ISO 62 (saturation in water at 23° C.).

In one advantageous embodiment, the barrier comprises a polymer, which contains ethyl vinyl alcohol or consists of ethyl vinyl alcohol.

In this embodiment, the polymer has up to 50-100 wt. %, preferably up to 80-100 wt. % structural units of formula (IV).

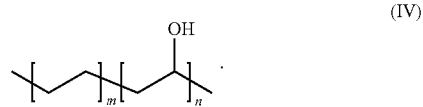

in which
m denotes 1-10,
n denotes 2-20.

Suitable ethyl vinyl alcohols are in particular random copolymers in which the ratio m/n is 30/100 to 50/100. These polymers are commercially available, for example, as the EVAL FP series or EP series from Kuraray. They are distinguished by a good processing capability, in particular, they may be processed very well jointly with the normally used jacket material polyethylene (PE) by coextrusion, because the melting viscosities and melting temperatures thereof are in a similar range.

The combination of cell gases from the group of hydrofluoroolefins and barrier layers according to the formulas (II), (III), (IV) described here results in particularly good, superadditive insulation properties of the thermally insulated conduit pipes. Such a positive interaction of these components is surprising. Without feeling bound to one theory, this superadditive effect can be attributed to the barrier properties of the materials according to formulas (II), (III), (IV).

Medium pipe (4): In principle, all medium pipes suitable for thermally insulated pipes can be used. Accordingly, the medium pipe can be formed as a wavy pipe, as a smooth pipe, or as a pipe having a corrugated jacket; it can be a rigid and linear pipe piece, a rigid curved pipe piece, or a flexible pipe piece.

The medium pipe can consist of polymer materials or metallic materials, preferably of polymer materials. Such materials are known per se and are commercially available or produced according to known methods. The materials are selected by a person skilled in the art according to the intended use, possibly after routine experiments.

In one embodiment, said medium pipe (4) is a flexible plastic pipe, the plastic is selected from the group acrylonitrile-butadiene-styrene (ABS), cross-linked polyethylene (PEXa, PEXb, PEXc), PE, polybutene (PB), polyethylene raised temperature (PE-RT), and polyketone (PK).

In a further embodiment, said medium pipe (4) is a flexible plastic pipe having an outer metal layer, the plastic is selected from the group ABS, PEXa, PEXb, PEXc, PE, PB, PE-RT, and PK, the metal is selected from the group aluminum including its alloys. Such inner pipes are also known as composite pipes.

In a further embodiment, said medium pipe (4) is a rigid plastic pipe, the plastic is selected from the group ABS, PEXa, PEXb, PEXc, PE, PB, PE-RT, and PK.

In a further embodiment, said medium pipe (4) is a flexible metal pipe, the metal is selected from the group copper including its alloys, iron including its alloys (for example, rustproof steels), and aluminum including its alloys.

In a further embodiment, said medium pipe (4) is a rigid metal pipe, the metal is selected from the group copper including its alloys, iron including its alloys (for example, rustproof steels), and aluminum including its alloys.

In a further embodiment of the medium pipe (4), the above-mentioned barriers made of plastic can be arranged on the outer side of the inner pipe or they can be formed by the medium pipe itself. A barrier on the medium pipe, or formed by the medium pipe itself, reduces the diffusion of steam from the medium pipe into the thermal insulation. According to the invention, such a ("second") barrier is combined with a further ("first") barrier above the thermal insulation.

Outer jacket (2): In principle, all outer jackets suitable for thermally insulated pipes can be used. The outer jacket can accordingly be formed as a corrugated pipe or smooth pipe or as one having a corrugated jacket. It can be a rigid and linear pipe piece, a rigid curved pipe piece, or a flexible pipe piece.

The outer jacket can consist of polymer materials or metallic materials, preferably of polymer materials. Such materials are known per se and are commercially available or produced according to known methods. The materials are selected by a person skilled in the art according to the intended use, possibly after routine experiments. Thermoplastic polymers, such as commercial PE types, are advantageously used. High-density PE (HDPE), low-density PE (LDPE), and linear low-density PE (LLDPE) are suitable. The layer thickness of the outer jacket (2) can vary in broad ranges, but is typically 0.5-20 mm, including the possibly provided barrier and barrier layers.

In one embodiment of the invention, the outer jacket contains the barrier described here, as described above. This embodiment is advantageous, since jacket and barrier can be produced simultaneously and thus cost-effectively by means of coextrusion.

In an alternative embodiment of the invention, the outer jacket does not contain the barrier described here, as described above. In this embodiment, the barrier is provided as a separate layer. This embodiment is advantageous because jacket and barrier can be produced separately and thus flexibly.

In one advantageous embodiment, the invention relates to a conduit pipe as described here, in which said outer jacket (2) is formed as a wavy pipe; and said medium pipe is formed as a flexible pipe piece and in particular has at least one medium pipe based on polyethylene and a thermal insulation based on PU and an outer jacket based on polyethylene.

In a further advantageous embodiment, the invention relates to a conduit pipe as described here, in which said conduit pipe is a rigid linear pipe piece and in particular has at least one medium pipe based on polyethylene or steel and thermal insulation based on PU and an outer jacket based on polyethylene.

In a further advantageous embodiment, the invention relates to a conduit pipe as described here, in which said outer jacket (2) is formed as a corrugated pipe. Such conduit pipes are advantageously combined with a medium pipe, which is formed as a flexible pipe piece and in particular comprises at least one medium pipe based on polyethylene or cross-linked polyethylene. Such conduit pipes are advantageously furthermore provided with a thermal insulation (3), which comprises a foam, the cell gas of which has the above-mentioned composition (wherein the cell gas particularly preferably contains at most 35% (cyclo)-alkane).

In a second aspect, the invention relates to methods for producing thermally insulated conduit pipes, bushings, and cover devices as described here. The invention is accordingly based on the object of providing improved methods for producing a conduit pipe, bushing, or cover device, which can be conducted both continuously and also discontinuously.

This aspect of the invention will be explained in greater detail hereafter.

In principle, the thermally insulated devices described here (cf. first aspect of the invention) can be produced similarly to the known methods. In this case, the known blowing agents (for example, cyclopentane, $CO_2$) are partially or completely replaced by the HFOs described here. Accordingly, facilities known per se can be used for the production, possibly after adaptation to new parameters, as a person skilled in the art can carry out as a routine measure. The methods described in EP0897788 and EP2213440 and EP2248648 and WO2008/019791 and EP1355103 and EP2340929 are hereby incorporated by reference.

In one advantageous embodiment of the method, the thermal insulation (3) is formed by foaming a plastic composition, which contains polymer components for the foam formation and HFO as a blowing agent. According to the invention, the HFO can either be added to one of the components and then processed or the starting components and the HFO are combined simultaneously in a metering device (for example, the mixing head).

In a further advantageous embodiment of the method, the plastic composition comprises two liquid components, wherein the first component contains a polyol and HFO and the second component contains isocyanate. The isocyanate component is preferably one based on methylene diisocyanate. However, other isocyanates, for example, those based on toluene-2,4-diisocyanate or aliphatic isocyanates can also be used.

In a further advantageous embodiment of the method, the plastic composition comprises two liquid components, wherein the first component contains a polyol and the second component contains isocyanate and HFO. In particular, those HFO components are preferred which have a good miscibility with the two liquid components and the boiling point of which is not excessively low (in particular not below 10° C.). The apparatus expenditure in the production is thus low; cooling systems only have to be provided to a small extent.

In a further advantageous embodiment of the method, the plastic composition consists of a melted component and this melt is combined with HFO under pressure.

Variant 1: If the thermally insulated pipe of this invention comprises one or more flexible medium pipe(s) and the outer jacket (13) comprises a barrier made of plastic, a method variant is advantageous in which
 (a) the at least one medium pipe is continuously supplied and is enveloped with a plastic film formed into a tube,
 (b) a foamable plastic composition is introduced into the space between medium pipe and tube as the thermal insulation layer,
 (c) the medium pipe and the tube are introduced into a mold formed from accompanying mold parts and leave this mold at its end, and then
 (d) the outer jacket is extruded onto the surface of the tube,
wherein the foamable plastic composition contains the polymer component(s) for the foam formation and HFO as the blowing agent. In this method variant
 the barrier can be introduced between the foamed thermal insulation layer and the inner side of the outer jacket, by the tube being formed from the polymer; or
 the barrier can be applied by coextrusion together with the outer jacket; or
 the barrier can be applied directly to the tube; or
 firstly, a layer of the outer jacket can be applied, followed by the barrier and followed by at least one second layer of the outer jacket.

In this method variant, furthermore in step a, the inner pipe
 can be drawn off continuously from a supply; or
 can be produced continuously by extrusion.

Variant 2: If the thermally insulated pipe of this invention comprises one or more rigid medium pipe(s) and the outer jacket (2) with barrier is made of plastic, a method variant is advantageous, in which
 (a) a medium pipe is centered inside an outer jacket and
 (b) a foamable plastic composition is introduced as the thermal insulation layer into the space between the medium pipe and the outer pipe,
characterized in that the foamable plastic composition contains the polymer components for the foam formation and HFO as the blowing agent. As already mentioned, said HFO can be mixed in a mixing head with the two liquid components, or said HFO is mixed beforehand with one of the two components and then supplied to a mixing head. In this method variant the barrier can be introduced between the foamed thermal insulation and the outer side of the outer jacket in the form of a tube; or the barrier can be applied to the inner side of the outer pipe; or the barrier can be provided in the outer pipe; or the barrier can be applied to the outer side of the outer pipe.

Variant 3: If the thermally insulated pipe of this invention contains a thermal insulation made of a thermoplastic foam, i.e., for example, made of PET, PE, or PP, a method variant is advantageous in which the HFO is pressed directly into the molten polymer matrix and subsequently results in the foaming of the thermoplastic used due to expansion. This can take place, for example, in that a polymer mixture is melted in the extruder and HFO under pressure is supplied into this melt. Upon leaving the mold, the provided blowing agent results in the foaming.

In a third aspect, the invention relates to novel uses of HFOs.

This aspect of the invention will be explained in greater detail hereafter.

In a first embodiment, the invention relates to the use of hydrofluoroolefins as a cell gas of the foam insulation in thermally insulated pipe systems, in particular in plastic medium pipe systems (PMP) and in plastic jacketed pipe systems (PJP).

HFOs can advantageously be used as the cell gas in foam insulations of conduit pipes, of cover devices, and of bushings, in particular of conduit pipes, of cover devices, and of bushings as described here (first aspect).

The invention will be explained in greater detail on the basis of the following examples; these are not to limit the invention in any manner.

Example 1: Production of a Conduit Pipe According to the Invention

Medium pipes having an external diameter of 63 mm and a wall thickness of 5.8 mm consisting of PExa were unwound continuously from a supply drum. Shortly before the foaming station, this medium pipe was enclosed by a PE film, which was in turn unwound from a supply and supplied via a forming shoulder. The corresponding quantity of a mixture made of a polymer isocyanate based on diphenyl methylene diisocyanate (MDI) having an NCO content of 31% and a polyol having an OH number of 410 mg KOH/g (determined according to ASTMD4274D) and having a water content of 0.8% was dispensed into the tube film, which was still open on the upper side. The isocyanate component was used slightly superstoichiometrically in relation to the reactive OH groups in this case. The two components were intensively mixed in a high-pressure mixing head at a pressure of 150 bar before the dispensing. The corresponding quantity of HFO/cyclopentane was in turn stirred into the polyol component beforehand. Immediately after the dispensing of the two-component mixture, the tube film was welded at the upper end. The PU foam arising immediately thereafter was forced by molding jaws into a cylindrical geometry and a jacket made of PE was extruded on continuously after the curing.

The obtained pipes were analyzed with respect to the cell gases contained in the foam. For this purpose, small samples of approximately 3 cm³ size were stamped out of the foam and they were mechanically destroyed in a closed system, such that the cell gases could enter the measuring apparatus. The gases present were qualitatively and quantitatively determined in a gas chromatograph.

Figure 3:
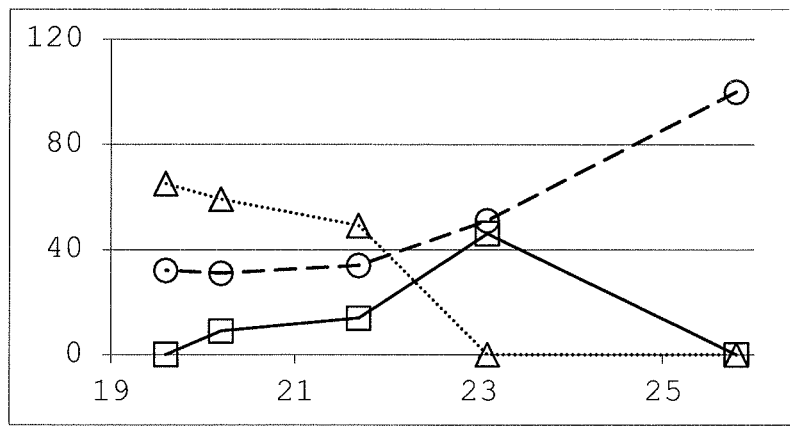
FIG. 3 shows a graphic representation of the dependence of the value of the thermal conductivity (abscissa in the unit mW/m*K) of a PU foam measured at 50° C. in dependence on the composition of the cell gas (ordinate in the unit vol %). The squares represent cyclopentane, the circles $CO_2$, and the triangles HFO.

Moreover, the value of the thermal conductivity was measured at 50° C. on 3 m long pipe pieces according to the norms DIN EN 253:2015-12 and EN ISO 8497:1996 ($I_{50}$ value). Furthermore, the composition of the cell gas was determined (according to the Chalmers method; described in Rämnas et al, J. Cellular Plastics, 31, 375-388, 1995); this method was also used in the following examples. The summary of the results is found in the following table, a graphic representation is apparent in FIG. 3:

| Cell gas | Unit | No 1.1 | No 1.2 | No 1.3 | No 1.4 | No 1.5 |
|---|---|---|---|---|---|---|
| $CO_2$ * | [Vol %] | 100 | 51 | 34 | 31 | 32 |
| Cp | [Vol %] | 0 | 46 | 14 | 9 | 0 |
| HFO 1233zd | [Vol %] | 0 | 0 | 49 | 59 | 65 |
| $O_2 + N_2$ | [Vol %] | 0 | 3 | 3 | 1 | 3 |
| $I_{50}$ value | [mW/m*K] | 25.8 | 23.1 | 21.7 | 20.2 | 19.6 |

* $CO_2$ forms automatically as a byproduct from the starting components and is not added (chemical blowing agent).

The data clearly prove the positive influence of HFO on the thermal conductivity.

Example 2: Model Experiment for Foamable Mixtures

In each case a quantity of 380-420 g polyol was provided in a beaker and the quantity of blowing agent indicated in the table was stirred in. The viscosity of the solution was determined in a rotation viscometer of the type viscometer DV I-Prime from Brookfield. The average value of three measurements was recorded.

Figure 5:
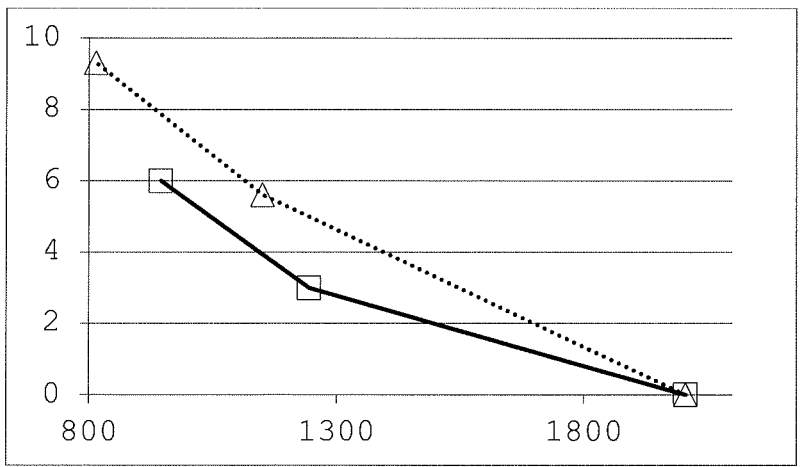
FIG. 5 shows a graphic representation of the viscosity (abscissa in the unit mP*sec) of a polyol having various contents (ordinate in the unit wt. %) of cyclopentane or HFO 1233zd, respectively. The squares represent cyclopentane and the triangles HFO.

The results are summarized in the table and shown in a graph in FIG. 5.

| Blowing agent | Content of added blowing agent [mol/100 g polyol] | Temperature [K] | Viscosity [mPa * s] |
|---|---|---|---|
| Polyol | Pure polyol, without blowing agent | 292.8 | 2005 |
| Cp | 0.043 | 293.2 | 1245 |
|  | 0.071 | 293.1 | 946 |
| HFO 1233zd | 0.041 | 293.0 | 1151 |
|  | 0.071 | 293.1 | 815 |

The data clearly prove the positive influence of HFO on the viscosity.

Example 3: Pore Size in PU Foams

The average pore size of PU foams, which contained different cell gases, was determined according to DIN EN 253:2015-12. An average was formed from three measurements in each case.

Figure 4:
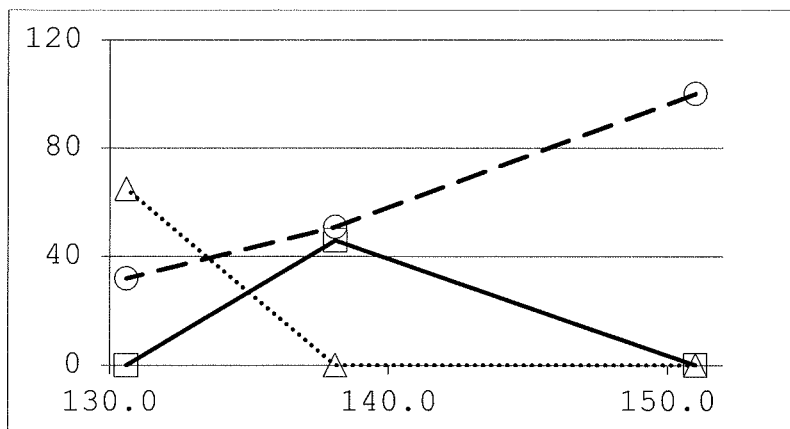
FIG. 4 shows a graphic representation of the average pore size (abscissa in the unit μm) of a PU foam in dependence on the cell gas composition (ordinate in the unit vol %). The squares represent cyclopentane, the circles $CO_2$, and the triangles HFO.

The results are summarized in the table and are shown in a graph in FIG. 4:

| Cell gas | Unit | No3.1 | No3.2 | No3.3 |
|---|---|---|---|---|
| $CO_2$ | [Vol %] | 100 | 51 | 32 |
| Cp | [Vol %] | 0 | 46 | 0 |
| HFO 1233zd | [Vol %] | 0 | 0 | 65 |

-continued

| Cell gas | Unit | No3.1 | No3.2 | No3.3 |
|---|---|---|---|---|
| $O_2 + N_2$ | [Vol %] | 0 | 3 | 3 |
| Pore size | [m] | 151.0 | 138.1 | 130.6 |

The data clearly prove the positive influence of HFO on the cell size.

Example 4: Determination of the Flashpoints of the Starting Material

According to the method of Pensky-Martens (DIN EN ISO 2719:2003-9), the flashpoints of specimens number 1 and number 3 were determined. Specimen number 2 was measured according to the method of Abel-Pensky (DIN 51755). The same polyol was used in each case as in Example 1. The results are summarized in the table.

| Component | Unit | No4.1 | No4.2 | No4.3 |
|---|---|---|---|---|
| Polyol | [g/100 g Polyol] | 100 | 100 | 100 |
| Cp | [g/100 g Polyol] | 0 | 4.8 | 0 |
| HFO 1233zd | [g/100 g Polyol] | 0 | 0 | 8.9 |
| Flashpoint scaled to 1013 mbar | [° C.] | 102.8 | <-21 | >56 |

The sample number 3 had a flashpoint which is significantly higher than the comparison sample number 2, which contained an equimolar content of cyclopentane. In particular, the sample number 3 is not to be classified as flammable according to the regulation EG 440/2008.

Example 5: Bubble Formation in Dependence on Blowing Agent

General: Thermally insulated conduit pipes having various cell gas compositions were produced according to Example 1.

Example 5.1 (comparison experiment): A quantity of cyclopentane (Cp) was added to the polyol component with the aid of a static mixture, such that a content of 7 wt. % resulted in relation to the polyol quantity. On the surface of the pipe thus produced, 12 bubbles were counted on the length of 30 cm, which had a diameter larger than 10 mm and were recognized easily even without further aids.

Example 5.2 A quantity of 2 wt. % cyclopentane and 11 wt. % HFO 1233zd was added to the polyol. No bubbles were found on the surface of the pipe thus produced on a produced length of 400 m.

Example 5.3: A quantity of 15 wt. % HFO 1233zd was added to the polyol. No bubbles were found on the surface of the pipe thus produced on a produced length of 350 m.

Results of the examples 5.1-5.3: The composition of the cell gases thus obtained was determined by means of GC as in Example 1, the obtained pipe was visually checked.

| Example | Composition of cell gas | Check |
|---|---|---|
| 5.1 (comparison) | 69% Cp<br>29% $CO_2$<br>0% HFO<br>2% H2 + N2 | 12 bubbles on 0.3 m length unusable |
| 5.2 | 17% Cp<br>27% $CO_2$ | 0 bubbles on 400 m length flawless |
| 5.3 | 55% HFO<br>1% H2 + N2<br>0% Cp<br>27% $CO_2$<br>71% HFO<br>2% H2 + N2 | 0 bubbles on 350 m length flawless |

The data prove that high quantities of Cp result in unusable insulated conduit pipes, while in contrast the partial or complete replacement thereof by HFO results in flawless insulated pipes.

While preferred embodiments of the invention are described in the present description, it is to be noted that the invention is not restricted thereto and can also be executed in another manner within the scope of the following claims.

We claim:
1. A thermally insulated conduit pipe (1), comprising
   a. at least one rigid, medium pipe (4);
   b. at least one thermal insulation (3) arranged around the medium pipe, wherein the thermal insulation (3) comprises a foam comprising
      (1) polymer components selected from the group consisting of polyurethanes, polyisocyanurates, thermoplastic polyesters and thermoplastic polyolefins; and
      (2) a cell gas containing
         (i) 0-50 vol % (cyclo)-alkanes selected from the group consisting of propane, butane, pentane, cyclopentane, hexane and cyclohexane,
         (ii) 0-50 vol % $CO_2$, and
         (iii) 10-100 vol % hydrofluoroolefins (HFOs) of formula (I)

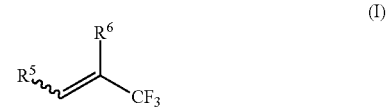

(I)

wherein $R^5$ and $R^6$ are each independently H, F, Cl, or $CF_3$; and
   c. at least one outer jacket (2) in the form of a rigid pipe around the thermal insulation.
2. The conduit pipe of claim 1 wherein the HFO is selected from the group consisting of R1233zd, R1336mzz and a combination thereof.
3. The conduit pipe of claim 1, wherein the foam comprises polyurethanes.
4. The conduit pipe of claim 1 wherein the medium pipe (4)
   a. is a rigid plastic pipe, the plastic is selected from the group consisting of ABS, PEXa, PEXb, PEXc, PE, PB, PE-RT, and PK; or
   b. is a rigid metal pipe, the metal is selected from the group consisting of copper including its alloys, iron including its alloys, aluminum including its alloys.
5. The conduit pipe of claim 1 wherein the outer jacket comprises a thermoplastic polymer selected from the group consisting of HDPE, LDPE, and LLDPE.
6. The conduit pipe of claim 1 wherein the cell gas contains 40-100 vol % HFOs with the proviso that the ratio of HFOs to (cyclo)-alkanes is at least 2.5:1.

7. The conduit of claim 6 wherein the cell gas contains 0-30 vol % (cyclo)alkanes.

8. The conduit pipe of claim 6 wherein the HFO is selected from the group consisting of R1233zd, R1336mzz and a combination thereof.

9. The conduit pipe of claim 1, wherein the foam is selected from the group consisting of:
   a. polyurethanes containing, as a cell gas, 50-100 vol % R1233zd and 0-50 vol % cyclopentane and 0-50 vol % $CO_2$;
   b. polyurethanes containing, as a cell gas, 50-100 vol % R1233zd and 0-45 vol % cyclopentane and 10-40 vol % $CO_2$;
   c. polyurethanes containing, as a cell gas, 50-100 vol % R1336mzz and 0-50 vol % cyclopentane and 0-50 vol % $CO_2$;
   d. polyurethanes containing, as a cell gas, 50-100 vol % R1336mzz and 0-45 vol % cyclopentane and 10-40 vol % $CO_2$;
   e. polyisocyanurates containing, as a cell gas, 50-100 vol % R1233zd and 0-50 vol % cyclopentane and 0-50 vol % $CO_2$;
   f. polyisocyanurates containing, as a cell gas, 50-100 vol % R1233zd and 0-45 vol % cyclopentane and 10-40 vol % $CO_2$;
   g. polyisocyanurates containing, as a cell gas, 50-100 vol % R1336mzz and 0-50 vol % cyclopentane and 0-50 vol % $CO_2$;
   h. polyisocyanurates containing, as a cell gas, 50-100 vol % R1336mzz and 0-45 vol % cyclopentane and 10-40 vol % $CO_2$.

10. The conduit pipe of claim 9 wherein the HFO, cyclopentane and $CO_2$ add up to 100 vol %.

11. The conduit of claim 9 wherein the HFO, cyclopentane, $CO_2$, and air add up to 100 vol %. ratio of HFO:Cp is at least 3:1.

12. The conduit pipe of claim 9 wherein the ratio of HFOs to (cyclo)-alkanes is at least 2.5:1.

13. The conduit pipe of claim 9, wherein the outer jacket (2) further comprises a barrier (9) wherein the barrier comprises at least one polymer, which:
   a. is formed as a layer,
   b. reduces the diffusion of gases out of the thermal insulation and into the thermal insulation, and
   c. which enables the diffusion of water out of the thermal insulation.

14. The conduit pipe of claim 13 wherein the barrier (9) is arranged:
   a. as a layer on the thermal insulation; and/or
   b. as a layer on the inner side of the outer jacket; and/or
   c. as a layer in the outer jacket.

15. The conduit pipe of claim 14 wherein the polymer
   a. comprises a copolymer of ethylene and vinyl alcohol or a copolymer of ethylene and carbon monoxide or a copolymer of ethylene and carbon monoxide and propylene, and
   b. has a layer thickness of 0.05-0.5 mm.

16. The conduit pipe of claim 15 wherein the polymer contains 50-100 wt. % structural units of the formula (II) or (III) or (IV),

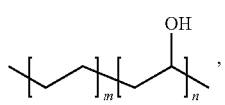
(IV)

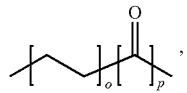
(II)

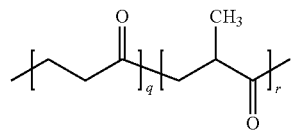
(III)

wherein
m is 1-10,
n is 2-20 provided that m/n is 30/100 to 50/100,
is 1 or 2,
p is 1 or 2,
q is 1-20, and
r is 1-20.

17. The conduit pipe of claim 1, wherein the outer jacket (2) further comprises a barrier (9) wherein the barrier comprises at least one polymer, which:
   a. is formed as a layer,
   b. reduces the diffusion of gases out of the thermal insulation and into the thermal insulation, and
   c. which enables the diffusion of water out of the thermal insulation.

18. The conduit pipe of claim 17 wherein the barrier (9) is arranged:
   a. as a layer on the thermal insulation; and/or
   b. as a layer on the inner side of the outer jacket; and/or
   c. as a layer in the outer jacket.

19. The conduit pipe of claim 18 wherein the polymer
   a. comprises a copolymer of ethylene and vinyl alcohol or a copolymer of ethylene and carbon monoxide or a copolymer of ethylene and carbon monoxide and propylene, and
   b. has a layer thickness of 0.05-0.5 mm.

20. The conduit pipe of claim 19 wherein the polymer contains 50-100 wt. % structural units of the formula (II) or (III) or (IV),

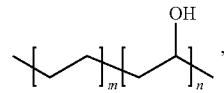
(IV)

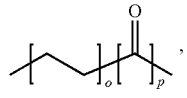
(II)

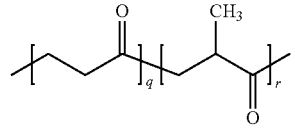
(III)

wherein
m is 1-10,
n is 2-20 provided that m/n is 30/100 to 50/100,
is 1 or 2,
p is 1 or 2,
q is 1-20, and
r is 1-20.

21. The conduit pipe of claim 1 wherein the outer jacket is in the form of a smooth pipe.

22. The conduit pipe of claim 21 wherein the outer jacket is in the form of a linear pipe.

23. The conduit pipe of claim 22 wherein the outer jacket comprises a thermoplastic polymer selected from the group consisting of HDPE, LDPE and LLDPE.

* * * * *